United States Patent
Bauer et al.

(10) Patent No.: US 6,572,184 B2
(45) Date of Patent: Jun. 3, 2003

(54) OPERATIONAL CONTROL FOR A MOTOR VEHICLE ROOF

(75) Inventors: Bernd Bauer, Eichenau (DE); Günther Schwanitz, Weilheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/005,316

(22) Filed: Dec. 7, 2001

(65) Prior Publication Data

US 2002/0117877 A1 Aug. 29, 2002

(30) Foreign Application Priority Data

Dec. 7, 2000 (DE) .......................................... 100 61 187

(51) Int. Cl.$^7$ ................................................. B60J 7/057
(52) U.S. Cl. ...................................................... 296/223
(58) Field of Search ........................................... 296/223

(56) References Cited

U.S. PATENT DOCUMENTS

| | | | | |
|---|---|---|---|---|
| 5,331,260 A | * | 7/1994 | Ahmed | 318/282 |
| 5,372,401 A | * | 12/1994 | Odoi et al. | 296/214 |
| 5,749,617 A | * | 5/1998 | Weissrich et al. | 296/223 X |
| 5,961,177 A | * | 10/1999 | Caye et al. | 296/213 |
| 6,409,261 B1 | * | 6/2002 | Lindinger et al. | 296/223 |

FOREIGN PATENT DOCUMENTS

| | | |
|---|---|---|
| DE | 44 11 388 C1 | 5/1995 |
| DE | 198 12 528 A1 | 9/1999 |
| DE | 199 08 253 A1 | 9/2000 |

* cited by examiner

*Primary Examiner*—Dennis H. Pedder
(74) *Attorney, Agent, or Firm*—Nixon Peabody LLP; David S. Safran

(57) ABSTRACT

An operational control for a motor vehicle roof, and a motor vehicle roof, which can be opened by motor over different intermediate stages with at least one rotary switch, with operating positions located around the rotary switch signaling the respective opening stage. The motor vehicle roof comprising several successive roof components including a wind deflector louver, a cover and a rear window, actuated by separate drives via the rotary motion of the rotary switch for approaching predetermined opening stages of the motor vehicle roof. The rotary switch includes a pushbutton located under the transparent or translucent cover for manual control of the motorized blind only when the motor vehicle roof is completely closed and operable to open the motorized blind both before a raising of the wind deflector louver and before movement of at least one of the cover and the rear window in an opening direction.

20 Claims, 4 Drawing Sheets

OPERATIONAL CONTROL FOR A MOTOR VEHICLE ROOF

BACKGROUND OF THE INVENTION

1. Field of the Invention

The invention relates to an operational control for a motor vehicle roof which can be opened by motor over different intermediate stages with at least one rotary switch, and operating positions which are located around the rotary switch and which signal the respective stage.

2. Description of the Related Art

One example of an operational control for a motor vehicle is disclosed in German patent DE 44 11 388 C1 which is used to control a complex, openable motor vehicle roof. The roof comprises a second cover, columns and cover elements which are all adjustable by means of separate drives, via a rotary switch during a rotary motion, in various peripheral areas for approaching predetermined opening stages, including an opening stage in which the motor vehicle is a completely open convertible. This control for actuating a complex motor vehicle roof allows comfortable, one-handed operation.

SUMMARY OF THE INVENTION

Therefore, one object of the present invention is to provide an operational control for a limited number of roof elements of an openable roof, including a blind for a transparent or translucent cover, which ensures comfortable, one-handed operation of all components.

The above object and other objects are achieved by providing an operational control for a motor vehicle roof openable by motor over different intermediate stages, the motor vehicle roof including a motorized blind and successive roof components, including a wind deflector louver, a cover and a rear window, which can be actuated by means of separate drives so as to approach predetermined opening stages, wherein the motorized blind is located under the cover. The operational control comprises at least one rotary switch with operating positions located around the rotary switch for signaling respective opening stages. The rotary switch is capable of a rotary motion for actuating the separate drives and includes a pushbutton which operates as a rocker for manual control of the motorized blind only when the motor vehicle roof is completely closed and operable to open the motorized blind both before a raising of the wind deflector louver and before movement of at least one of the cover and the rear window in an opening direction. The invention is also directed to a motor vehicle roof in combination with the operational control of the present invention.

Reliable operation of relatively few roof elements, specifically a wind deflector louver, cover and rear window, of an openable motor vehicle roof is ensured by the present invention. In addition, reliable operability of a blind, free of problems and damage, is achieved in that the pushbutton contained in the rotary switch is used for manual control of the motorized blind which is located under the transparent or translucent cover. The pushbutton allows control by permitting the blind to be optionally moved by the motor only with the motor vehicle roof completely opened and completely wound up before raising the wind deflector louver and before moving the cover and the rear window. This design, on the one hand, yields motorized blind control without problems with the motor vehicle roof closed and, on the other hand, by promptly winding up the blind, prevents it being exposed to the wind load with the motor vehicle roof opened or partially opened.

Advantageously, the push button can be provided with another roof control function. Thus, according to one advantageous development of the invention, it is provided that, in the open position of the motor vehicle roof, a quick closing or central closing function for an overall closing process of all components of the motor vehicle roof is assigned to the pushbutton.

Two advantageous versions of the operational control are possible. According to a first version in which the rotary switch during rotary motion activates in succession the individual drives for the roof elements in various peripheral areas for approaching predetermined opening positions of the motor vehicle roof, it is provided that the rotary switch, between the peripheral area for actuating the wind deflector louver and cover and the peripheral area for actuating the rear window, has a neutral position in which the blind can be manually moved by means of the pushbutton.

According to a second version, two concentric rotary switches are used, by which an inner rotary switch contains a pushbutton for control of the blind, wherein one of the two rotary switches is used for actuating the wind deflector louver and the cover and the other rotary switch is used to actuate the rear window. The blind can be actuated manually via the pushbutton only when the inner and the outer rotary switch both assume a neutral position which corresponds to the completely closed motor vehicle roof. In this version of two concentric rotary switches, a stationary ring is positioned advantageously between the two rotary disks and bears symbols for indicating the operating positions, for example, in the form of pictograms. In this design of the operational control with two concentric rotary switches, a quick closing function can be implemented for manually closing the motor vehicle roof, for example, by turning the rotary switch or the two rotary switches beyond the neutral positions.

The rotary switches preferably have catch positions in order to be able to repeatedly trigger predetermined opening positions of the motor vehicle roof in a concerted manner.

When several drives are triggered in combination for actuation of the respective roof elements and of the blind, various strategies can be used. For example, there can be evaluation of the operational control by several controls at the same time. Certain operating positions are logically assigned to only one drive so that the respective control decides for itself alone whether it is possible to react to a control request. Alternatively, evaluation of the operational control by a single control and relay of movement requests to other controls follow. Depending on the position of the operational control, the individual drives are triggered in a suitable sequence from the main control. Moreover, it can be provided that some special operating positions control either one drive or the other for the roof elements, depending on the situation.

DETAILED DESCRIPTION OF THE INVENTION

Figure 1:
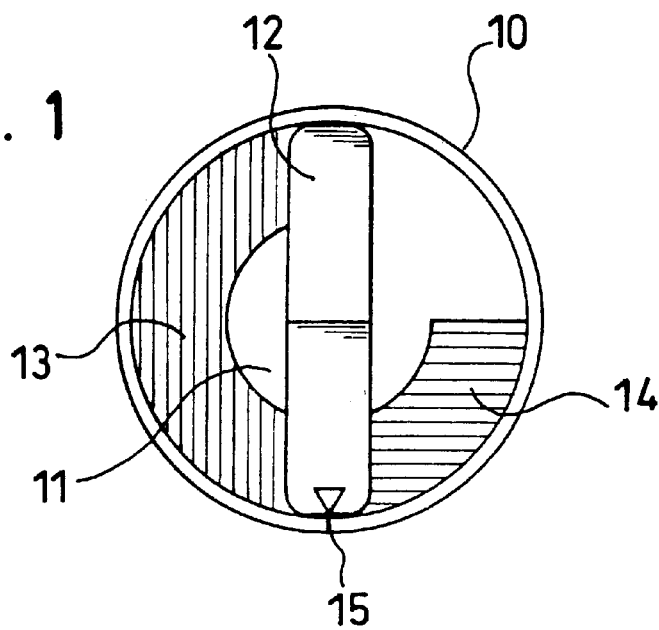
FIG. 1 is a plan view of a first embodiment of the operational control of the present invention.

The operational control shown in FIG. 1 in a first embodiment for actuation of an openable motor vehicle roof has a generally circular configuration and comprises a generally circular cylindrical base body 10, also called a console, a rotary switch 11 which is located concentrically on the base body 10, a first operating position area 13 with the shape of a circular segment and a corresponding second operating position area 14.

The rotary switch 11 can be turned with respect to the base body 10 and includes a grip or handle 12. The two operating position areas 13, 14 signal the operating positions of the rotary switch and can be provided with symbols for labeling or indicating the operating positions in the manner shown, by way of example, in FIG. 2. In the embodiment of the operational control shown in FIG. 1, the first operating position area 13 extends over a circular arc range of roughly 180°, for example on the face of a clock from 0600 to 1200. Counterclockwise, the first operating position area 13 is adjoined by the second operating position area 14 which extends with reference to a clock face over roughly 90° from 0300 to 0600. In the 0600 position, the rotary switch 11 with its grip 12 assumes a neutral, or zero, position, indicated by reference number 15, and to which an arrow symbol on the top of the grip 12 points when it is in the neutral position.

The grip 12 of the rotary switch 11 is designed as a pushbutton which can be moved, around a transverse axis 38 which runs through the center of the grip 12, in the manner of a rocker into two different unstable positions by pressing on one or the other end of this pushbutton or grip 12. The function assignment of the elements of the operational control follow below from the explanation of FIG. 3 in conjunction with FIGS. 4A–4E. The rotary switch 11 is used to control different elements of an openable motor vehicle roof, while the pushbutton and rocker function of the grip 12 of the rotary switch 11 is designed to control a blind 21 underneath the transparent cover 17 of the motor vehicle roof. By turning the grip 12 of the rotary switch 11 clockwise in FIG. 1, for example, into the first catch position, alternatively into a first unlocked position, a wind deflector louver 16 is raised at its rear edge, by which a ventilation slit is formed between the rear edge of the wind deflector louver 16 and the front edge of the adjacent movable cover 17. Before actuating the wind deflector louver 16, i.e. immediately at the start of the operating displacement of the grip 12 of the rotary switch 11, the blind 21 is first rolled up so that this component which is relatively sensitive to the wind is not exposed to a load by oncoming or outgoing air. The same applies to actuation of the grip 12 of the rotary switch 11 counterclockwise, as is explained below using FIGS. 5A–5C.

Figure 3:
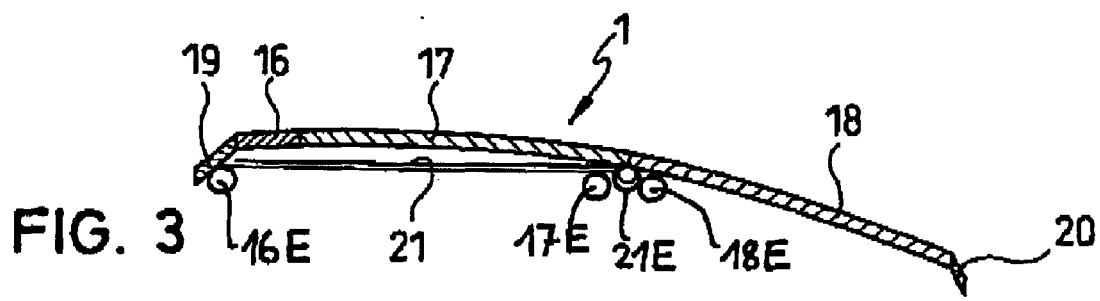
FIG. 3 is a schematic of a lengthwise sectional view of an openable motor vehicle roof in the closed state, wherein the roof can be opened by a motor via the operational control of the present invention as shown in FIGS. 1 and 2 over various intermediate stages.

FIG. 3 shows the openable motor vehicle roof 1 in the completely closed position. The openable motor vehicle roof 1 comprises, in a sequence from front to back, a wind deflector louver 16, a transparent cover 17 and a rear window 18. In the closed state, these elements 16, 17 and 18 of the openable motor vehicle roof 1 are flush with the fixed motor vehicle roof which is formed, following the front edge of the wind deflector louver 16, by the cowl 19, and which, following the lower edge of the rear window 18, is limited by the rear apron or the rear hatch 20. The elements 16, 17 and 18 are made preferably of glass or a transparent plastic so that the motor vehicle roof 1 in the closed state is formed by a continuous glass surface.

Figure 6:
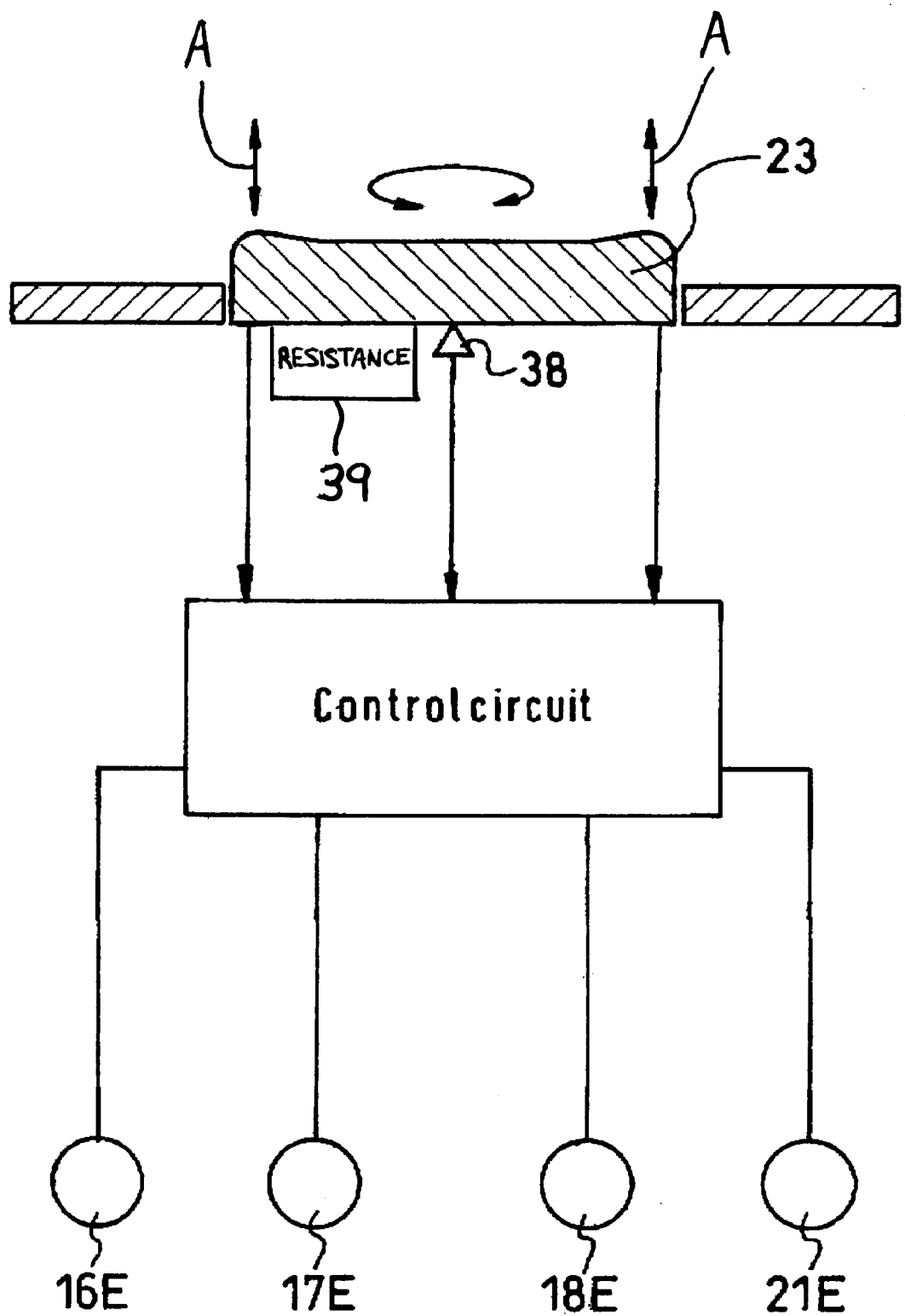
FIG. 6 is a schematic showing a cross-sectional view of the control of FIG. 2.

The blind 17 is positioned underneath the transparent cover 17. With the motor vehicle roof closed, the blind 21 is in the pulled-tight position which covers the cover 17 from underneath or in the opened position. Both the blind 21 as well as the movable parts of the motor vehicle roof, the cover 17, the rear window 18 and the wind deflector louver 16, can be actuated by a motor. Preferably, this actuation is achieved by means of separate drives which can be controlled via the operational control of FIG. 1 (alternatively by the control of FIG. 2 and FIG. 6). Specifically, as shown in FIG. 3, the separate drives include electric drives 16E, 17E and 18E for driving wind deflector louver 16, cover 17 and rear window 18, respectively, and electric drive 21B for driving blind 21. A conventional motor vehicle roof is generally disclosed in published German patent application DE 199 08 253 A1, the entire contents of which is hereby incorporated by reference.

Figure 4A:
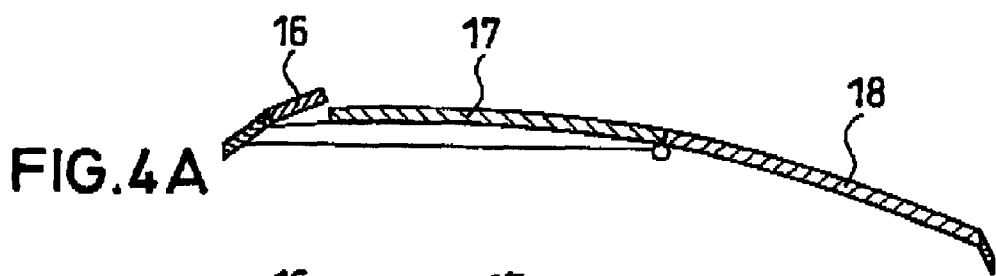
FIGS. 4A–4E is a schematic similar to FIG. 3 but showing various stages of opening of the cover of the motor vehicle roof.

Control of the openable motor vehicle roof and of the blind 21 using the operational control shown in FIG. 1 is now explained with reference to FIGS. 4A–4E. The elements, proceeding from the closed position of the motor vehicle roof shown in FIG. 3, can be continuously and/or discretely transferred to different opening stages. The closed position of the motor vehicle roof shown in FIG. 3 corresponds to the position of the rotary switch 11 from FIG. 1, i.e. the neutral position of the rotary switch 11, in which its grip 12 points to the neutral position 15 with its arrow marking. Proceeding from this neutral position 15, by turning the rotary switch 11 clockwise into a first angular area (on a clock face roughly the area between 0600 and 0800), continuous opening of the wind deflector louver 16 or opening, which takes place via several intermediate catches, is initiated as shown in FIG. 4A. As discussed above, this raising of the wind deflector louver 16 is preferably preceded by automatic opening of the blind 21. The position of the motor vehicle roof shown in FIG. 4B corresponds to another rotary position of the grip 12 of the rotary switch 11 which follows the rotary position as shown in FIG. 4A. The former rotary position, which corresponds to, for example, the 0900 position on a clock face, corresponds to the first opening position of the cover 17 as the wind deflector louver 16 continues to be raised, i.e. proceeding from the closed position of the cover 17 to the raised position of the rear edge of the cover 17.

Figure 4B:
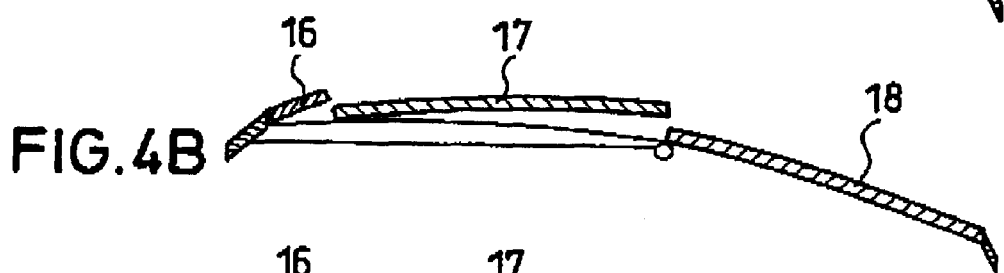
Figure 4C:
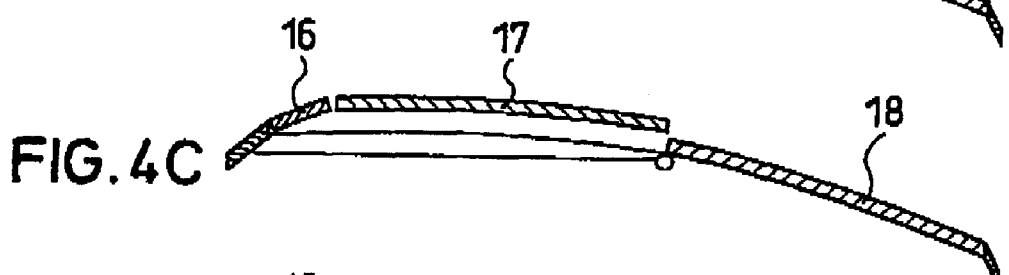
Figure 4D:
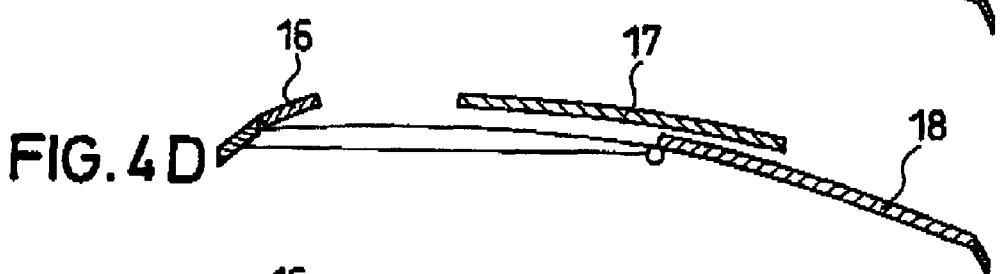
Figure 4E:
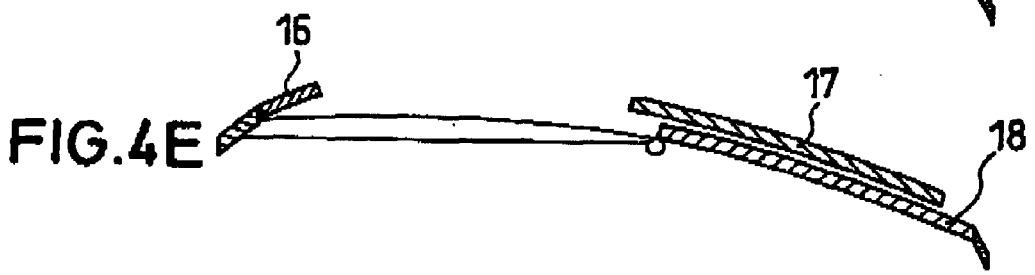

The position of the motor vehicle roof shown in FIG. 4C corresponds to the position of the grip 12 of the rotary switch 11 which follows clockwise the position from FIG. 4B and in which also the front edge of the cover 17 is raised so that the cover 17 is in an alignment with the wind deflector louver 16 in its raised position, thereby making it possible to push the cover 17 backwards via the corresponding guide means (not shown) over the rear window 18. The positions of the grip 12 of the rotary switch 11 which correspond to the area between 0900 and 1200 on a clock face correspond to the cover positions which are shown in FIGS. 4D–4E in which the cover 17 is moved continuously or over several intermediate catches and ultimately completely over the rear window 18.

Figure 5A:
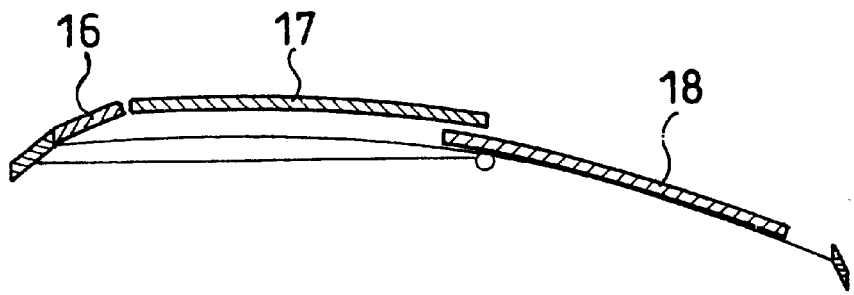
FIGS. 5A–5C is a schematic showing various stages of opening of the rear window of the motor vehicle roof.
Figure 5B:
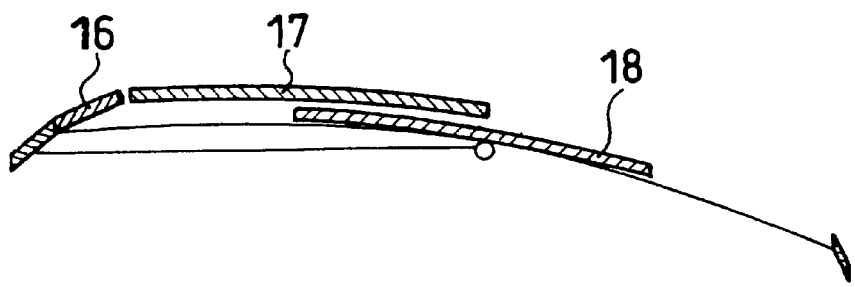
Figure 5C:
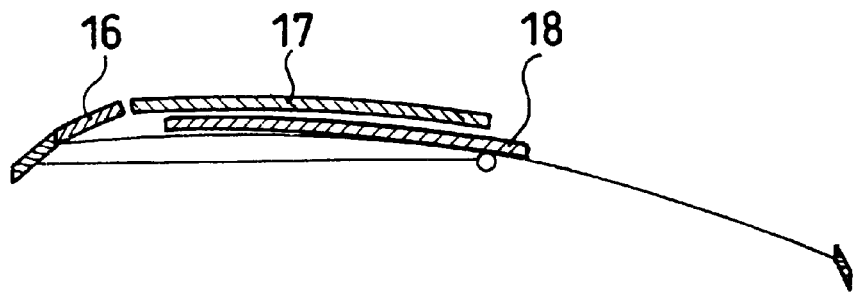

In all the positions of the wind deflector louver 16 and of the cover 17 shown in FIGS. 4A–4E, a control means or circuit (shown in FIG. 6 relative to embodiment of FIG. 2) prevents any motorized actuation of the blind 21 and the rear window 18 in order not to expose the blind 21 to unnecessary wind loading and to prevent the rear window 18 from colliding with the cover 17. Motorized movement of the rear window 18 via the rotary switch is only allowed by the control circuit when the wind deflector louver 16 and the cover 17 have been transferred into the closed position (FIG. 3) by transferring the grip 12 of the rotary switch 11 counterclockwise into its neutral position 15. Proceeding from the neutral position 15 which has then been reached again, the grip 12 of the rotary switch 11 can be moved counterclockwise within the second operating position area 14 in order to move the rear window 18 continuously or over several intermediate catches for example into its open position, as is shown in FIGS. 5A–5C.

Any actuation of the grip 12 of the rotary switch 11 counterclockwise proceeding from the neutral position 15 results in that first the blind 21 is rolled up, whereupon next the rear edge of the cover 17 is raised in order to clear space underneath the cover 17 for the movement of the rear window 18 in the opening direction which then takes place as the grip 12 continues to be actuated counterclockwise. The start of this adjustment motion of the rear window 18 occurs with its front edge located underneath the rear edge of the cover 17 as shown in FIG. 5A. An advanced intermediate position before complete opening of the rear window 18 is shown in FIG. 5B in which the front edge of the rear window 18 comes to rest roughly underneath the center of the cover 17. FIG. 5C shows the ultimate end position of the rear window 18 in which the front edge of the rear window 18 comes to rest generally in the area of the front edge of the cover 17, while the rear edge of the rear window 18 comes to rest generally in the area of the rear edge of the cover 17. The rear window 18 is closed when the grip 12 of the rotary switch 11 is turned clockwise into the neutral position 15.

As already indicated, motorized actuation of the blind 21 only, with the openable motor vehicle roof 1 completely closed, is possible, specifically when the grip 12 of the rotary switch 11 is in the neutral position. In this case, the blind 21 can be set into any position by motor by tapping on one end or the other of the grip 12 which is then tilted in the manner of a rocker (not shown specifically in the Figs.).

Preferably, in conjunction with the operational control shown in FIG. 1, a central or quick closing function for closing all parts of the motor vehicle roof is also made available. To activate the quick closing function, a pushbutton which, with the roof closed, is advantageously used to actuate the blind 21. The pushbutton can be adjusted in the manner of a rocker in the form of the correspondingly supported grip 12 of the rotary switch 11. Two versions for the quick closing function are possible. According to one version, the actuation of each end of the rocker switch leads to all the just opened roof elements, i.e. the cover 17 and/or the rear window 18, moving into the closed position. Alternatively, it can be provided that one end of the rocker is used for closing the rear window 18 and the other end of the rocker is used for closing the cover 17 in conjunction with the closing of the wind deflector louver 16.

Figure 2:
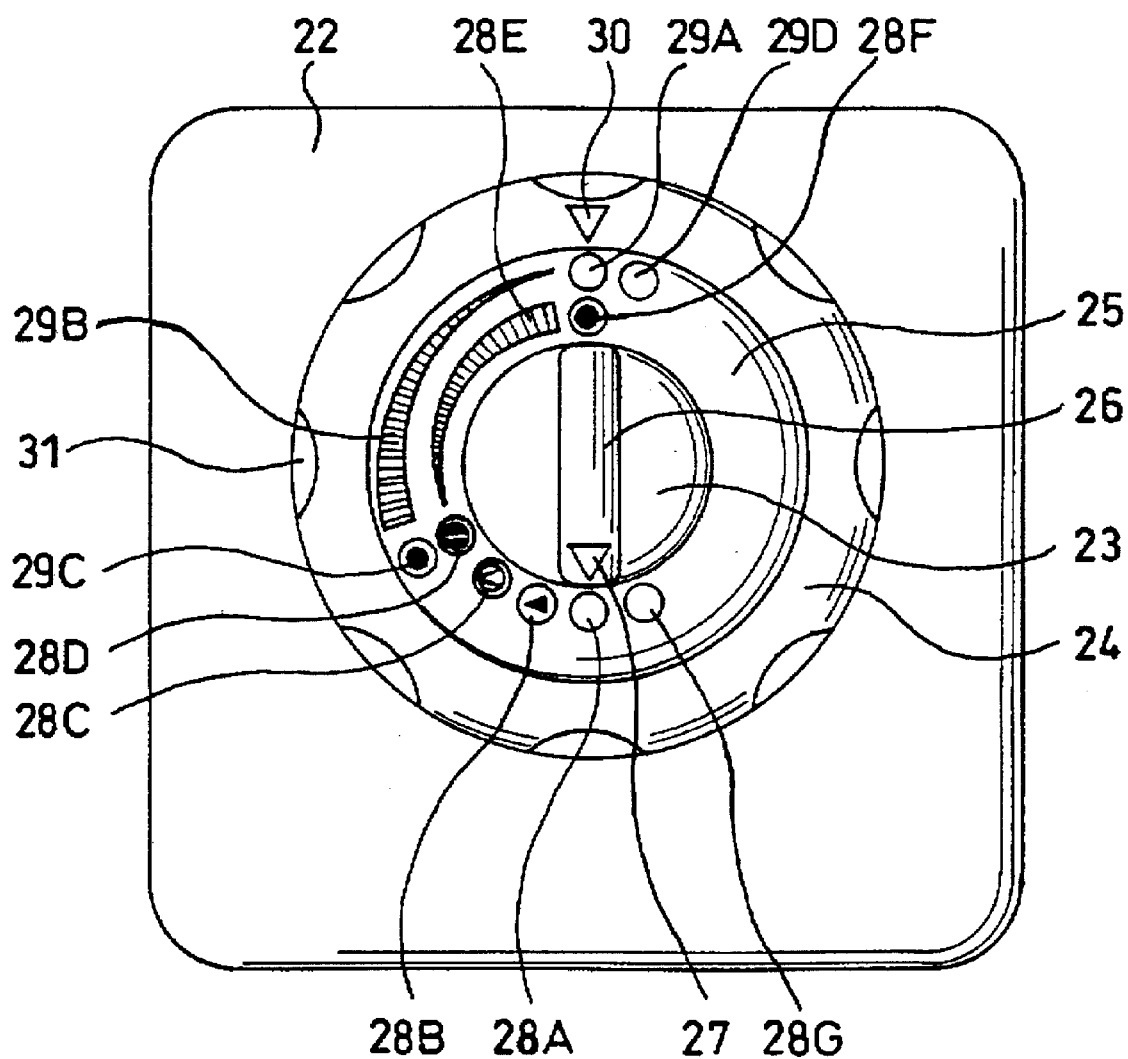
FIG. 2 is a plan view of a second embodiment of the operational control of the present invention.

FIG. 2 shows an embodiment of the operational control which is alternative to FIG. 1. This operational control consists of a rectangular base body 22 and two rotary switches 23, 24 which are arranged concentrically to one another on the base body 22, between which there is a stationary operating position indicator ring 25. Similarly to the rotary switch 11 in FIG. 1, the inner rotary switch 23 comprises a grip 26 with a position indicator 27 which is made as an arrow. The stationary operating position indicator ring 25 is provided with several pictograms which bear reference numbers 28A to 28F and 29A to 29C in order to indicate operating positions or the positions of the openable motor vehicle roof. Moreover there is also an arrow acting as a position indicator 30 on the external rotary switch 24.

Aside from the projecting grip 26, the top of the inner rotary switch 23 runs coplanarly to the top of the stationary operating position indicator ring 25. In the area of the outside edge of the outer rotary switch 24, grip depressions (one of which is labeled at 31) are molded. The grip depressions 31 are spaced uniformly around the periphery, and have the same shape.

The assignment of the roof elements to this operational control is as follows. The inner rotary switch 23 is used to actuate the wind deflector louver 16 and the cover 17. The pictograms which correspond to the positions of these movable elements are then located adjacent to the outside edge of the inner rotary switch 23 on the operating position indicator ring 25. In this embodiment, the circle at 28A corresponds to the closed position or the zero position; the arrow 28B to the raising of the wind deflector louver 16; the arrow 28C to the raising of the rear edge of the cover 17; the two parallel lines at 28D to the lifting of the front edge of the cover 17; and the swelling arrow 28E to the advancing opening of the cover 17 up to the complete opening position 28F. The outer rotary switch 24 is used exclusively for operating the rear window 18. The pictograms 29A to 29C, which correspond to the opening position of the rear window 18, are located on the outside edge of the operating position indicator ring 25.

The circle 29A corresponds to the closed position, the arrow 29B, which swells counterclockwise, corresponds to increasing opening, and the circle 29C to complete opening of the rear window 18.

In this embodiment, actuation of the blind 21 by tilting the grip 26 is possible only when all zero position symbols 27, 28, 29, 30 are located in alignment with one another along a common line, as shown in FIG. 2. Otherwise, the blind 21 is always rolled up as soon as one of the rotary switches 23, 24 is actuated. The coupling of the switch elements 26, 23 and 24 for precluding unwanted constellations or even collisions can be implemented either by mechanical blocking on the switch or by the corresponding exclusions in the switching logic. As an example of mechanical blocking, for example, the grip 26 can be tilted for actuating the blind 21 only in the position shown in FIG. 2, while, when one of the rotary switches 23 or 24 is twisted, a blocking ring (not shown), which is turned concomitantly, prevents titling. Otherwise the control of the openable motor vehicle roof proceeds as described above using FIGS. 4A to 4A and FIGS. 5A–5C.

The operational control shown in FIG. 2 also allows quick closing of the motor vehicle roof. This quick closing can either be released, as explained above using FIG. 1, specifically by means of the grip 26 which is made as a rocker (see arrows A in FIG. 6) and which then is, for example, pushed axially down, or, alternatively, by actuating the inner and/or the outer switch 23 or 24 counterclockwise to indicators 29D and 28G, respectively, preferably against a compressive resistance 39 as it is overcome beyond the zero position. In doing so, closing of the motor vehicle roof, as may be necessary in an emergency, can take place by actuating one or both of the rotary switches 23, 24. In the latter case, it can also be provided that with one rotary switch the cover and the wind deflector louver are closed, and with the other rotary switch, the rear window is closed.

We claim:

1. An operational control for a motor vehicle roof openable by motor over different intermediate stages, the motor vehicle roof including a motorized blind and successive roof components, including a wind deflector louver, a cover and a rear window, which can be actuated by means of separate drives so as to approach predetermined opening stages, the motorized blind being located under the cover, the operational control comprising:

at least one rotary switch with operating positions located around the rotary switch, said operating positions signaling respective opening stages, said at least one rotary switch capable of a rotary motion for actuating the separate drives, said at least one rotary switch including a pushbutton which operates as a rocker, said pushbutton operable for manual control of the motorized blind only when the motor vehicle roof is completely closed and operable to open the motorized blind both before a raising of the wind deflector louver and before movement of at least one of the cover and the rear window in an opening direction.

2. The operational control of claim 1, wherein the pushbutton is formed as a grip of said at least one rotary switch, said grip operable to be tilted in the manner of a rocker.

3. The operational control of claim 1, wherein the pushbutton includes an indicator corresponding to an emergency function to initiate an overall closing process of the motor vehicle roof in the open position of the motor vehicle roof.

4. The operational control of claim 2, wherein the pushbutton is movable into one rocker position to cause the wind deflector louver and the cover to close and into another rocker position to cause the rear window to closed.

5. The operational control of claim 1, wherein the rotary switch is movable through a rotary motion into different peripheral areas of the control to activate the separate drives in succession for approaching the predetermined opening stages of the motor vehicle roof, wherein the rotary switch includes a neutral position between a peripheral area for actuating the wind deflector louver and the cover and a peripheral area for actuating the rear window, wherein said pushbutton is operable to move the blind when said rotary switch is in the neutral position.

6. The operational control of claim 1, wherein said at least one rotary switch includes two concentric rotary switches including an inner rotary switch containing the pushbutton and an outer rotary switch, wherein one of said two concentric rotary switches is operable to actuate the wind deflector louver and the cover and the other rotary switch is operable to actuate the rear window, and wherein the pushbutton is operable to actuate the blind only when the inner and the outer rotary switches assume a zero position which corresponds to a completely closed motor vehicle roof.

7. The operational control of claim 6, further including a stationary ring positioned between the two rotary switches, said stationary ring including markings indicating the operating positions.

8. The operational control of claim 6, wherein at least one of said inner and said outer rotary switches includes an indicator corresponding to an emergency function when in the zero position for a manual closing process of the motor vehicle roof by turning the said least one rotary switch beyond the zero position.

9. The operational control of claim 8, wherein said one of said rotary switches includes an indicator corresponding to an emergency function for manual closing of the wind deflector louver and of the cover and the other rotary switch includes an indicator corresponding to an emergency function for manual closing of the rear window.

10. The operational control of claim 8, wherein a resistance force is applied to at least one of the rotary switches during turning beyond the zero position.

11. The operational control of claim 10, wherein at least one of the rotary switches is a catch rotary switch with discrete operating positions.

12. A motor vehicle roof openable over different intermediate stages, comprising:

successive roof components, including a wind deflector louver, a cover and a rear window;

a respective separate drive associated with each of said wind deflector louver, said cover and said rear window for operating the components so as to approach predetermined opening stages;

a motorized blind located under the cover;

at least one rotary switch with operating positions located around the rotary switch, said operating positions signaling respective opening stages, said at least one rotary switch capable of a rotary motion for actuating the separate drives, said at least one rotary switch including a pushbutton which operates as a rocker, said pushbutton operable for manual control of the motorized blind only when the motor vehicle roof is completely closed and operable to open the motorized blind both before a raising of the wind deflector louver and before movement of at least one of the cover and the rear window in an opening direction.

13. The roof of claim 12, wherein the pushbutton is formed as a grip of said at least one rotary switch, said grip operable to be tilted in the manner of a rocker.

14. The roof of claim 12, wherein the pushbutton includes an indicator corresponding to an emergency function to initiate an overall closing process of the motor vehicle roof in the open position of the motor vehicle roof.

15. The roof control of claim 13, wherein the pushbutton is movable into one rocker position to cause the wind deflector louver and the cover to close and into another rocker position to cause the rear window to closed.

16. The roof of claim 12, wherein the rotary switch is movable through a rotary motion into different peripheral areas of the control to activate the separate drives in succession for approaching the predetermined opening stages of the motor vehicle roof, wherein the rotary switch includes a neutral position between a peripheral area for actuating the wind deflector louver and the cover and a peripheral area for actuating the rear window, wherein said pushbutton is operable to move the blind when said rotary switch is in the neutral position.

17. The roof of claim 12, wherein said at least one rotary switch includes two concentric rotary switches including an inner rotary switch containing the pushbutton and an outer rotary switch, wherein one of said two concentric rotary switches is operable to actuate the wind deflector louver and the cover and the other rotary switch is operable to actuate the rear window, and wherein the pushbutton is operable to actuate the blind only when the inner and the outer rotary switches assume a zero position which corresponds to a completely closed motor vehicle roof.

18. The roof of claim 17, further including a stationary ring positioned between the two rotary switches, said stationary ring including markings indicating the operating positions.

19. The roof of claim 17, wherein at least one of said inner and said outer rotary switches includes an indicator corresponding to an emergency function when in the zero position for a manual closing process of the motor vehicle roof by turning the said least one rotary switch beyond the zero position.

20. The roof of claim 19, wherein said one of said rotary switches includes an indicator corresponding to an emergency function for manual closing of the wind deflector louver and of the cover and the other rotary switch includes an indicator corresponding to an emergency function for manual closing of the rear window.

* * * * *